Dec. 19, 1939. D. K. ALLISON 2,183,531
pH METER
Filed Dec. 7, 1936 2 Sheets-Sheet 1

INVENTOR.
Donald K. Allison,
BY Robert W. Fulwider
ATTORNEY.

Dec. 19, 1939.   D. K. ALLISON   2,183,531
pH METER
Filed Dec. 7, 1936   2 Sheets-Sheet 2
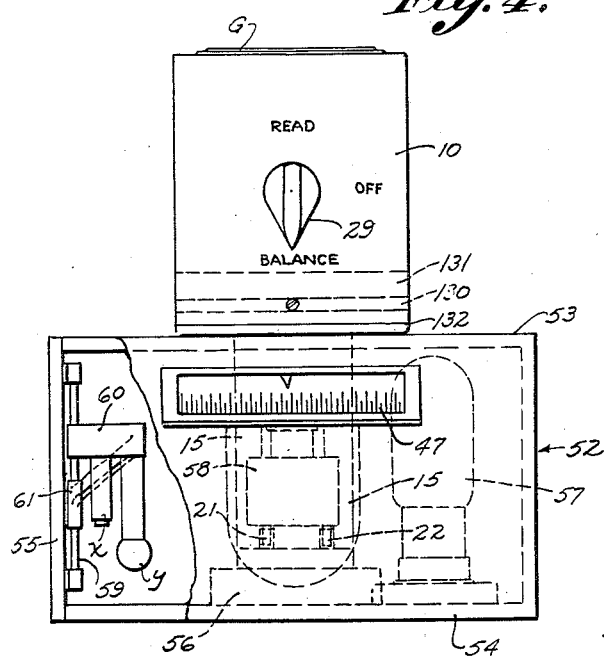
Fig. 4.
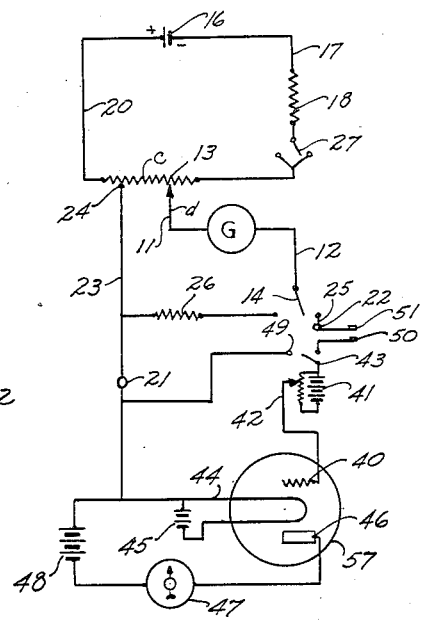
Fig. 5.
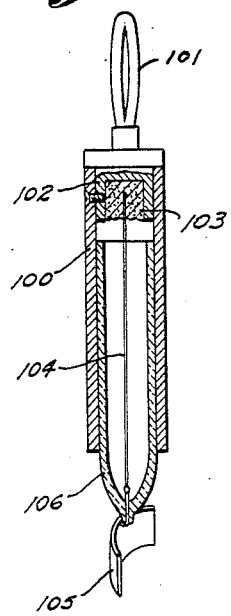
Fig. 8.
Fig. 9.
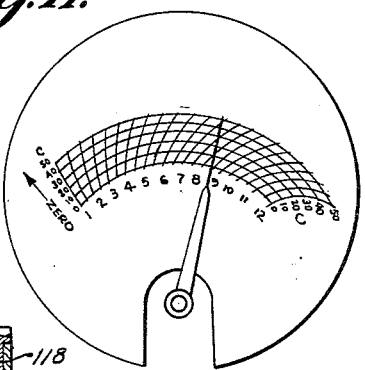
Fig. 11.
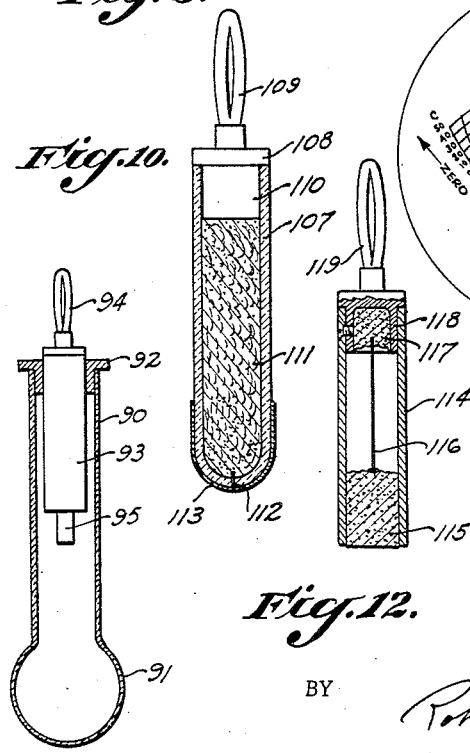
Fig. 10.
Fig. 12.
INVENTOR.
Donald K. Allison,
BY
Robert W. Fulwider
ATTORNEY.

Patented Dec. 19, 1939

2,183,531

UNITED STATES PATENT OFFICE 2,183,531 pH METER

Donald K. Allison, Beverly Hills, Calif., assignor to National Technical Laboratories, Pasadena, Calif., a corporation of California Application December 7, 1936, Serial No. 114,610

4 Claims. (Cl. 175—183)

My invention relates broadly to electrical measuring apparatus, and, as the title implies, more particularly to apparatus for determining the pH of a solution by the method of measuring electromotive forces generated by the action of said solution on certain electrode systems. This application is a continuation in part of my copending application Serial Number 749,559 filed October 23, 1934, now Patent No. 2,095,305, by reference to which it will be seen that the electrical circuit employed in this invention is a simplified and improved form of the circuit disclosed and claimed in said former application, and it is to be understood that no claim is made herein to any feature claimed in said prior application.

The major object of this invention is to provide a much simpler and more accurate meter apparatus for measuring pH values from electrode potentials than any heretofore offered to the trade, and one which can therefore be manufactured and sold at a lower price than heretofore possible. This simplified pH meter finds great utility in all branches of industrial and research activities where it is desired to make rapid and accurate measurements of pH values, potentiometric titrations and other measurements involving the determination of electrode potentials.

One of the principal advantages of my apparatus resides in the fact that it does not employ a standard cell, which effects a great saving in time as well as giving increased accuracy.

Another of the many advantages of my device is its extreme mobility due to its compact form which is secured without any loss of durability or strength, which gives my device a universal utility and adaptability impossible to attain in hitherto known devices. A further advantage resides in the fact that my device utilizes but one adjustable control, thereby achieving great simplicity and rapidity in the measurement of pH values.

It is also an object of my invention to provide direct reading scales which are accurate in the extreme and which automatically take account of all the variable factors in the operation of the apparatus so that the operator can immediately read pH values on the instrument scale without resorting to complicated tables or curves.

It is a further object of my invention to provide a new and improved type of electrode, which had wide utility and is particularly valuable in the measurement of pH values.

These and other objects and advantages of my invention will be readily apparent from the following description of a preferred form thereof, and from the accompanying drawings in which:

Fig. 4 is a front elevation of a modified form of meter, with a portion of the casing broken away.

Fig. 5 is a wiring diagram of the modified form of Fig. 4.

Fig. 8 shows a measuring electrode of the platinum or gold type.

Fig. 9 shows another form of the type electrode illustrated in Fig. 8.

Fig. 10 showes a novel form of glass electrode.

Fig. 11 shows another type of meter scales.

Fig. 12 shows a novel form of antimony electrode.

Figure 1:
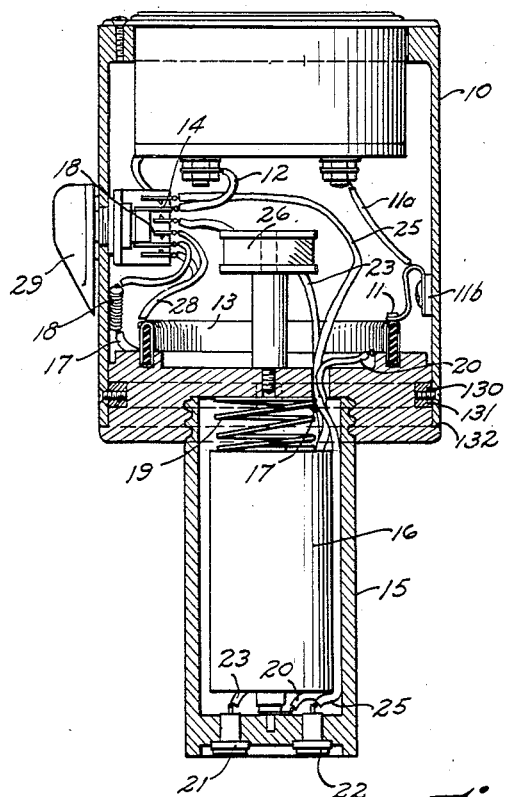
Fig. 1 is a side elevation partly in section of one form of my device.
Figure 2:
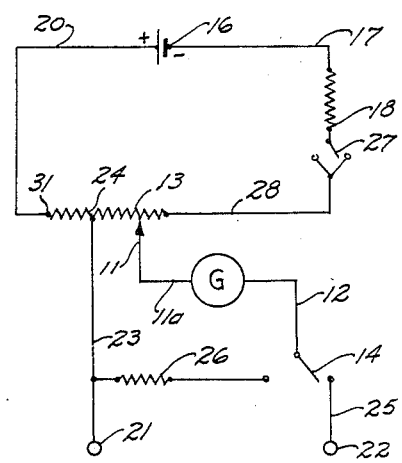
Fig. 2 is a wiring diagram of the device of Fig. 1.

Referring now to the drawings and particularly to Figs. 1 and 2 thereof, the numeral 10 indicates a housing which is preferably cylindrical in shape and open at each end. An annular flange or rib 130 is provided on the inner face of the housing near its lower end, and a head piece 131 with a corresponding annular groove on its outer face is mounted in the lower end of the housing 10, the flange and groove being in engagement to securely hold the head in place within the housing while permitting them to be rotated with respect to each other. The head is also preferably provided with a flange 132 on its under face which overlaps the lower edge of the wall of housing 10 to assist in securing the two parts together. A galvanometer G is mounted in the upper end of the housing 10 with its scale facing upwardly. The lower or inner side of the galvanometer is provided with two binding posts to which leads 11a and 12 are attached. Lead 11a connects to a slide wire connector 11 supported on a block 11b fast to the inside of the housing 10 and is adapted to slide across or around a potentiometer coil 13 carried by the top of head 131, the relationship of these parts being such that when the housing 10 is rotated with respect to the head 131 the slide wire connector 11 slides along the coil 13 to give with the battery circuit a potentiometer assembly. The lead 12 is connected to the blade of a single pole double throw switch 14.

A casing 15, also preferably cylindrical in shape, is screwed into a threaded aperture or recess in the bottom of head 131 and is adapted to receive a battery 16 therein. The shell of the battery 16 constituting the negative pole thereof is connected through a spring 19 and a lead 17 to a voltage dividing resistance 18, the spring 19 also serving to maintain the positive pole of the battery, on the other end thereof, in contact with a connector 20 which leads to one end of the potentiometer coil 13. The lower end of casing 15 is provided with two sockets or jacks 21 and 22 into which the plugs of appropriate electrodes can be inserted. The jack 21 is connected by a wire 23 to a point 24 on the potentiometer coil 13, and the jack 22 is connected by a wire 25 to one side of the double throw switch 14. The other side of the switch 14 is connected through a calibrating resistance 26 to connector 23 and thence to the potentiometer coil 13. The voltage dividing resistance 18 connects with the blade of a single pole double throw switch 27, the other contacts of which are connected by lead 28 to one end of potentiometer coil 13. While switches 14 and 27 have been shown separate in Fig. 2 to better illustrate the wiring of my device, in practice they are preferably combined in one switch mechanism operated by a single knob or lever 29 as shown in Fig. 1, since switch 27 is always in closed position when switch 14 is in closed position, and is open when switch 14 is open. In the claims the term head will be used to include the assembly of head piece 131 and casing 15. It is now well established, that the pH of a solution can be accurately determined by measuring the E. M. F. generated between two suitable electrodes placed in contact with that solution, since it has been found that the magnitude of this E. M. F. is a definite function of the pH of the solution. In my device the E. M. F. of the electrodes is balanced against an E. M. F. produced from an outside source which can be subsequently measured very accurately, and by using appropriate meter scales as herein provided, the pH of the solution is read directly from the scale.

Figures 6, 7:
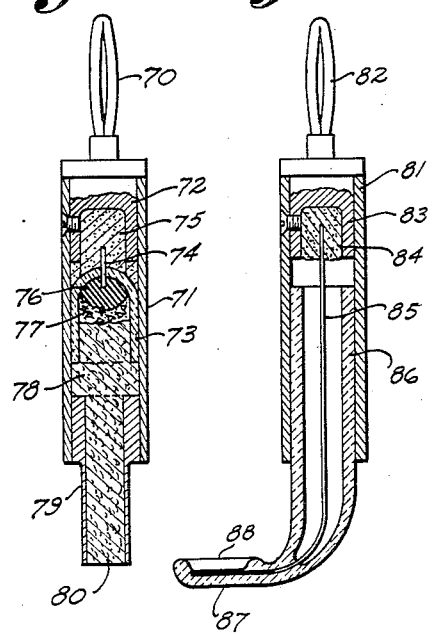
Fig. 6 is a vertical section of one form of my improved reference electrode.
Fig. 7 shows an improved form of micro-electrode.

In operating my device, a platinum or other suitable measuring electrode, such for example as illustrated in Fig. 7, is plugged into jack 21, and a reference electrode such as, for example, the calomel half-cell shown in Fig. 6 is plugged into jack 22. These two electrodes are placed in contact with the solution to be measured so that an E. M. F. will be generated between them, which, as previously mentioned, is a function of the pH of the solution. The knob 29 is turned to what may be termed the "balance" position to put the blade of switch 14 in contact with lead 25 and electrode 22, and switch 27 closes its circuit between battery 16 and potentiometer 13. The sliding contact 11 is then moved (as by rotating casing 10 and holding head 131 in Fig. 1) to a point along potentiometer coil 13 where the E. M. F. supplied by the potentiometer is exactly equal and opposite to that generated between the electrodes, at which point the galvanometer G shows no deflection. When this setting of slide wire 11 has been obtained, the knob 29 is turned to "read" position which throws switch 14 over to contact with the terminal of calibrating resistance 26, automatically opening the electrode circuit. In constructing my pH meter the resistance 26 is made of such a value and the scale on the galvanometer is so constructed and coordinated with this value and the other characteristics of the circuit that the pH of the solution is read directly on the scale of the galvanometer.

At this point it should be noted that the polarity of noble metal electrodes of this type changes at a certain pH for given temperatures, which value is for instance approximately 7.67 at 25° C. for a quinhydrone electrode. To compensate for this change and make the meter direct reading for all values of pH, the potentiometer is tapped by the connector 23 at the point where the polarity of leads 11 and 23 changes as the slide wire 11 is moved along the potentiometer coil 13. The movement of the galvanometer is then so adjusted that its normal rest or zero point falls at the pH polarity change point for the usual operating temperature, for example, pH 7.67 at 25° C. This construction automatically takes care of the change in polarity of the electrode.

If an antimony or other electrode which does not change polarity is used as the measuring electrode a modification in the wiring of my device as shown in Fig. 2 becomes advisable. In this case, the connector 23 is connected to the potentiometer coil 13 at the end point thereof indicated by the numeral 31, thus eliminating any polarity change in the E. M. F. delivered by the potentiometer circuit. The value of calibrating resistance 26 must also be changed to correspond to the E. M. F.-pH characteristics of the measuring electrode, and an appropriate scale coordinated therewith to give direct reading results with the proper temperature corrections.

As is well known in the art the magnitude of the E. M. F. generated between two electrodes in a solution will vary with the temperature, and consequently when this potential difference is translated into pH values the temperature factor must be accounted for. These necessary temperature corrections are now fairly well established in the art for most electrodes, but so far as I know, no one has ever produced a meter scale which incorporates these corrections in the scale itself so that when a potential difference actuates the meter needle, the corresponding pH of the solution can be read directly as the point of intersection of the reference indicator with the appropriate scale, as is the case in the meter scales of this invention.

In preparing the scale of my invention the pH values for a particular type electrode at an arbitrary temperature are coordinated with the pH meter circuit characteristics, so that given deflections of the galvanometer needle will indicate the correct pH values on the scale for that temperature. Additional spaced circumferential lines are drawn and the radial points thereon corresponding to the pH values of the first temperature scale are noted. The temperature corrections are then plotted with respect to each of said radial points on the various temperature lines and later joined as the arc of a circle of appropriate radius.

This procedure gives a scale or a series of concentric scales in which the pH calibrations correspond to the millivolt characteristics of the pH meter circuit, which calibrations are curved tangential to or show such departure from normal radial or linear calibrations that their intersection with the temperature ordinate corresponds to the correct pH of the solution at the temperature indicated by said ordinate. The temperature range of the meter scale can of course be made of any extent desired by merely varying the number of concentric temperature ordinate lines.

Likewise the pH range of the scale may be varied in accordance with the usable range of the electrodes being used.

Figure 3:
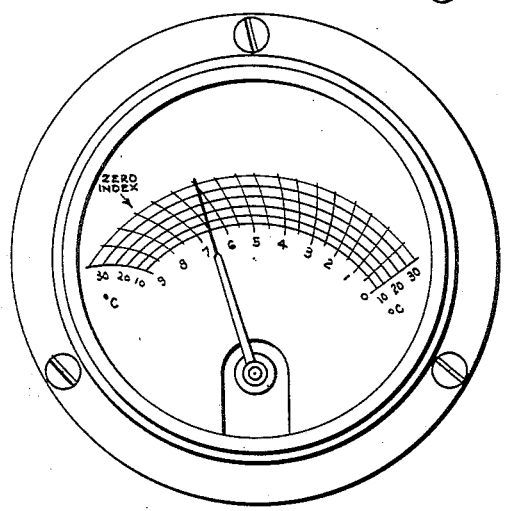
Fig. 3 shows one form of meter scale.

When electrodes are used which change polarity and it therefore becomes necessary to connect the potentiometer leads to compensate for the change, a scale such as shown in Fig. 3 is used, wherein it is seen that the zero index or rest position of the needle on the scale is set at the pH value at which the polarity changes, so that the scale will be direct reading at all times. When an electrode, such as antimony for instance, is used which does not change polarity, a scale such as shown in Fig. 11 is provided where the zero index or rest point of the galvanometer needle is at the zero point of the pH values.

It will be understood that while I have in each case illustrated a meter with a moving indicator and a fixed scale, that my invention also comprehends the alternate form of meter where the scale is movable and the needle or other indicator remains fixed. Likewise it will be apparent that the scales of my invention could also be rectilinear instead of curvalinear if desired.

For best results with the form of my pH meter shown in Figs. 1 and 2, I find it advisable to use as a reference electrode a calomel half-cell or other electrode of that general type, and in Fig. 6 I have illustrated an improved and novel form of calomel half-cell which is peculiarly well suited for this purpose. Referring now to Fig. 6, the numeral 70 indicates a metal plug fastened to the upper end of a barrel 71 preferably made of Bakelite and cylindrical in shape. The plug 70 is connected by any convenient means to a metal shoe 72, which may conveniently be formed as a shell with depending sides mounted in the upper end of barrel 71. An inverted vessel 73 preferably of glass is supported in the barrel 71 just below the shoe 72 and has a platinum wire 74 extending through its upper face. The upper portion of the wire 74 is embedded in a body of solder 75 to hold it to the inside of metal shoe 72 and make electrical contact therewith, while the lower end of the wire 74 terminates in a globule of mercury 76 contained in the vessel 73 and supported on a bed of calomel 77 which is in turn supported on a body of agar jell 78 which contains a concentration of potassium chloride in accordance with the calibration of the instrument. The agar jell 78 fills the lower end of vessel 73, barrel 71 and the interior of a tube 79 slidably mounted in the lower end of barrel 71. The lower end 80 of tube 79 is open to permit agar to be extruded when the tube is moved upwardly in the barrel 71. By this construction the calomel is protected at all times and cannot be contaminated by the solution which is being measured. When one measuring operation is completed and it is desired to use the cell on a new solution, the tube 79 is merely pushed up a little in barrel 71, forcing a small amount of agar out of the lower end 80 of the tube, which action cleans out the tube and presents a new agar surface at 80 for contact with the solution to be measured.

For the measuring electrode in this form of my device, an electrode of the type shown in Fig. 7, wherein is illustrated a novel form of micro-electrode using platinum or other measuring electrode material can be used. In Fig. 7 the numeral 81 indicates a barrel preferably of cylindrical shape which is provided with a closed top having a plug 82 mounted therein which is adapted to fit into a socket or jack in the meter proper. As in the case of the electrode of Fig. 6 a metal shoe, in this case numbered 83, is fastened in the upper end of the barrel 81 and in contact with the plug 82. The inside of the shoe 83 is filled with solder 84, in which is embedded a platinum wire 85 which extends down through the barrel 81 and a tube 86, preferably made of glass, and terminates in a metal contact plate or disc 87. The electrode shown in Fig. 7 is a special micro type and has a glass cup 88 formed by the lower end of tube 86 which is bent horizontally as shown. In this case the metal wire 85 is also bent to follow the glass tube shape and the disc 87 lies horizontally in the base of the cup 88. One advantage gained in employing a micro-electrode, having the combination of glass cup 88 and metal disc 87 contained therein, is that this construction makes it possible to measure the pH of minute quantities of liquid, as for instance tear drops, drops of blood and the like. When using the micro-electrode the cup 88 is placed immediately below the end of the reference electrode, such for instance as the calomel half-cell shown in Fig. 6, so that contact is made by both electrodes with the solution being measured.

As is well known in the art, in measuring pH it is necessary that a small quantity of quinhydrone, quinone-quinhydrone, hydroquinone-quinhydrone, hydrogen, or some other similar reactant be added to the solution being measured so that a known relationship can be established between the E. M. F. of the electrodes and the pH of the solution. The platinum or other similar metal electrode is then usually described by the name of the reactant added to the solution, as for example it would be referred to as the quinhydrone electrode if it was used in measuring the pH of a solution to which quinhydrone had been added, while it is still, of course, fundamentally a metal electrode. On the other hand, if the metal contact of the measuring electrode, represented by the disc 88 in the micro-type illustrated in Fig. 7, is formed of antimony or like metal, no auxiliary substances such as quinhydrone are needed.

Figs. 8, 9 and 12 illustrate modified forms of macro-electrodes, all being suitable for use as measuring electrodes in combination with the meter apparatus illustrated in Figs. 1 and 2.

The electrode of Fig. 8 comprises a barrel 100 of Bakelite or other suitable substance formed as a cylinder with its lower end open and its upper closed end having a plug 101 extending therefrom. A metal shoe 102 with depending walls is secured in the upper end of the barrel 100 in contact with the plug 101 and is filled with solder 103 in which is embedded one end of a wire 104 preferably made of platinum or some other good conductive metal. A metal foil or plate 105 is secured in the bottom of a glass tube 106 which is held in barrel 100 and depends therefrom. The foil 105 is of some suitable metal for electrode purposes such as platinum, antimony, etc., and if the wire 104 is of like metal, it is attached directly thereto, if not, a short stud wire of the same kind of metal as the foil, is run through the bottom of the tube 106 to connect wire 104 to foil 105.

The electrode of Fig. 9 is designed chiefly to give a maximum metallic contact surface at exceptionally small cost, and comprises a glass barrel 107 with a cap 108 and plug 109 extending therefrom and connected to a shoe 110 in the upper end of the barrel. The barrel is closed at the bottom and preferably of curved shape and is filled with a cheap low melting point metal 111 such as solder. A stud 112 of platinum or other suitable metal wire passes through the lower end of the barrel and connects with an outer shell 113 of platinum, antimony or the like, which is formed by sputtering or other mirror process to full coat the end of the barrel with a very thin layer or shell of the electrode contact metal.

In Fig. 12 is illustrated a simplified form of antimony electrode which comprises a barrel 114 preferably made of Bakelite or similar material with a plug of antimony 115 in the bottom end thereof. A wire 116 has its lower end buried in the antimony plug 115 and its upper end embedded in a solder filling 117 in a metal shoe 118 fastened in the inside of the upper end of barrel 114. An extending plug 119 connects to the shoe 118.

In measuring the pH of solutions of a strong oxidizing or reducing nature or other characteristics which disturb the usual electrode equilibrium it often becomes necessary to resort to the use of a glass electrode for the measuring electrode, although a calomel half-cell or similar electrode can still be used for the reference electrode. When a glass electrode is used, the current which will flow through the glass membrane is so small that it cannot be read on the rugged type of galvanometer that I prefer to use, unless amplified, and to meet this condition, I have devised the modified form of pH meter illustrated in Figs. 4 and 5.

In this form of my invention, the numeral 16 again indicates a battery, 20 a connection leading from the positive side of the battery to one side of a potentiometer coil 13, and 17 a connection leading from the negative pole of the battery to a voltage dividing resistance 18 connected through a single pole double throw switch 27 to the other side of potentiometer coil 13. A lead 23 again taps potentiometer coil 13 at a point 24 and connects to a terminal 21, which may be in the form of a jack to receive a plug as hereinafter described. A slide wire connector 11 leads from the potentiometer to a galvanometer G as before, which in turn is connected by a wire 12 to the blade of a single pole double throw switch 14, one side of which is connected by a wire 25 to a terminal 22, preferably in the form of a jack and which is connected to a jack 51. The other side of the switch 14 is connected to a calibrating resistance 26 which is connected to connector 23 at any convenient point along its length. It will be seen that the circuit of Fig. 5 down to this point is exactly the same as the circuit of Fig. 2.

Imposed on the above described circuit is a vacuum tube amplifier which may be constructed and connected in the following manner. The vacuum tube 57 is provided with an adjustable grid bias comprising grid 40, battery 41 and potentiometer 42, one end of which is connected to the blade of a single pole double throw switch 43. The terminal 21 of the measuring circuit is connected as by a plug inserted in the jack 21 to the filament 44 of the vacuum tube which is heated by a battery 45. The plate circuit of the tube comprises plate 46, galvanometer 47 and battery 48, and may also if desired include a space charge grid with its battery, although this addition has not been illustrated since it is not essential. The plate circuit is connected to the filament circuit in known manner and to the terminal 21, which latter is connected through a lead 49a to one contact 49 of switch 43. The other contact of switch 43 is connected to a jack 50.

The preferred physical embodiment of my device embodying the circuits just described is illustrated in Fig. 4 wherein the numeral 10 again represents a housing, containing among other things a galvanometer G and switches 14 and 27, and having knob 29 on its outside. The head piece 131 and the flange 130 are shown with dotted lines, as is the battery casing 15, and the jacks 21 and 22 carried on its lower face. In this form also the assembly of head piece 131 and casing 15 will be referred to as the head. The numeral 52 indicates generally a box like case or cabinet which includes a top 53, a bottom 54 and a side 55 which is swingable about one edge to serve as a door in one end or side of the cabinet. Preferably centrally disposed on the inside of bottom 54 of the cabinet 52 is a base plate or block 56 provided with a pair of upstanding plugs spaced the same distance apart as jacks 21 and 22. The top 53 is provided with an aperture into which the casing 15 is fitted, the proportions of the cabinet 52 and the spacing of the aperture being such that the jacks 21 and 22 will fit snugly over the plugs in block 56 when the flange 132 of head 131 is resting solidly upon the upper face of top 53.

The vacuum tube 57 is mounted on the base 54 in convenient manner and the galvanometer 47 of the amplifying circuit is preferably mounted on the front wall of the cabinet so as to have its scale visible from the outside thereof. The magnetic mechanism of the galvanometer 47 is shown in broken lines and indicated generally by the numeral 58. The necessary leads for connecting these elements in conformance with the wiring diagram are thought to be obvious and therefore not shown in Fig. 4.

As previously mentioned. the door 55 is swingable about one vertical edge thereof in known manner and it preferably has a vertical rod 59 mounted on its inner face. A horizontally extending bracket 60 with a brace 61 is swingably mounted on said rod 59 and movable vertically thereon. The bracket 60 is provided with holding means not shown for supporting two electrodes indicated by the letters $x$ and $y$ in Fig. 4. By thus providing an electrode mounting right in or on the instrument itself, the necessity of ring stands or other auxiliary equipment is obviated, since the electrodes can be connected while in place, and lowered into a beaker containing the solution whose pH is to be measured. The jacks 50 and 51 can be built into the bracket 60 if desired, or may be attached to the ends of flexible leads to be slipped over the plugs of electrodes $x$ and $y$ as needed.

A superior form of glass electrode for use with my vacuum tube amplifier type of pH meter is illustrated in Fig. 10. The numeral 90 indicates a glass tube whose lower end is preferably bulb shaped and very thin to form a glass membrane 91 of sufficiently low resistance to permit a small current to flow therethrough. The upper end of the tube 90 is sealed with a cap 92 made of Bakelite or other suitable material in which an ordinary electrode 93 is mounted. This electrode 93 may be of the calomel half-cell type, or the metallic contact type as desired, and is provided with an outside plug 94 and an inside contact surface 95. The bulb and tube are filled with a reference substance which may be in the form of a solution or a jell such as agar jell, so that contact surface 95 of the electrode 93 is immersed therein. This solution is usually of a known or fixed pH. In operation, the bulb is placed in the solution whose pH is to be measured, in contact with which is a reference electrode which may or may not be of the same type as that used in the glass electrode. The reference electrode is connected to the jack 51 if it is negative with respect to the glass electrode, and to jack 50 if it is positive with respect to the glass electrode, the glass electrode in each case being connected to the other of said jacks. When the glass bulb 91 is immersed in the unknown solution and the circuit is properly connected, a small E. M. F. difference is established between the reference solution inside of the bulb and the solution in which the bulb is immersed, which difference is a duplicable function of the pH values of the two solutions.

If a calomel half-cell is used for the internal electrode of the glass electrode the E. M. F. generated between the glass electrode and the external calomel reference electrode will be approximately .059 volt times the difference in pH between the inside and outside solutions at 25° C. If the internal electrode is quinhydrone for instance, a scale calibrated as shown in Fig. 3 is used to read the pH values, whereas if an antimony electrode is used, the scale of Fig. 12 gives the correct pH values.

In preparing my device for operation it is advisable to first arrive at a proper setting or control of the amplifier current to get an amplification characteristic suitable for the pH range of the instrument. This is done by immersing the electrodes $x$ and $y$, plugged in to jacks 50 and 51, in a solution of known pH, and connecting switches 14 and 27 to have the E. M. F. from the potentiometer 13 oppose that of the electrodes. The potentiometer 13 is set to give this known pH value of the solution on G when the instrument is at "read" position.

The switches 14 and 27 are then turned to "balance" position, which puts the electrodes and potentiometer in the grid circuit with switch 41 closed in contact with the lead from jack 50. Under these conditions the E. M. F. across 50 and 51 generated by the electrodes opposes the E. M. F. furnished by the potentiometer 13 across terminals 21 and 22. The bias on grid 40 is then adjusted until a certain pre-selected current is read on galvanometer 47, which value is taken as the arbitrary reference value for further operations. Contact 49 and lead 49a are provided to close the grid to filament circuit when the switches 14 and 27 are in the "read" position, and to thereby prevent excessive currents through galvanometer 47, although this precaution is not always necessary.

In measuring the pH of solutions, the electrodes are immersed in or otherwise placed in contact therewith and the potentiometer 42 left in its previously adjusted position, the knob 29 being turned to "balance" position. The slide 11 of potentiometer coil 13 is then adjusted until the galvanometer 47 reads the value previously chosen by the method above explained. When this point has been reached, the knob 29 is turned to "read" position to disconnect the electrodes from the circuit and the correct pH value of the solution is read on the scale of G.

While in the foregoing description I have illustrated certain preferred embodiments of my invention it is to be understood that I do not propose to be limited strictly thereto. For instance while I deem it highly preferable to mount the potentiometer coil on the head piece and the slide-wire contact upon the movable housing to effect potentiometric adjustments without the necessity of additional movable means therefor, I believe that the proper scope of my invention should also include a pH meter in which the potentiometer is adjusted by external means such as a knob or crank attached either to the slide wire or the coil of the potentiometer. Likewise I do not mean to limit my invention to the precise form of electrodes shown or the exact calibrations appearing on the meter scales illustrated. Furthermore, while I deem the circuits illustrated herein the preferred potentiometric means for use in my invention, it is to be understood that other circuits which will accomplish substantially the same purpose may be adapted for use in the housing and head assembly shown herein, and that my invention is meant to comprehend such circuit alterations, it being evident that if a modified circuit is employed in the housing assembly shown, that appropriate changes in the location of the scales and their relation to the galvanometer may be made without departing from the proper scope of my invention. Also various changes in proportion and material can be made in adapting the device of my invention to particular needs, all of which are properly included within the scope of the appended claims.

I claim as my invention:

1. A pH meter which includes: a housing and a head associated together and rotatable with respect to each other, the housing carrying one relatively movable part of a potentiometer and the head carrying the other relatively movable part of said potentiometer so that rotation of said housing and head with respect to each other will vary the output of said potentiometer; a pair of terminals adapted to be connected to a pair of electrodes; a galvanometer; an electrical circuit connecting said potentiometer, galvanometer and terminals in such a manner that the output of said potentiometer can be balanced against the E. M. F. generated by said electrodes when they are in contact with a solution whose pH is to be measured; and means for determining said pH values as a function of the balanced output of said potentiometer.

2. A pH meter as set forth in claim 1 in which there is also a calibrating resistance and switch means for putting said resistance in said circuit when one of said terminals is disconnected from said circuit.

3. A pH meter as set forth in claim 1 in which said housing and head are associated with a cabinet containing vacuum tube means for amplifying the current produced across said terminals by said electrodes.

4. A pH meter as set forth in claim 1 in which said head is contained in a cabinet in which there is a vacuum tube amplifying means, said cabinet having a door therein on which is mounted a bracket for holding said electrodes.

DONALD K. ALLISON.